(12) United States Patent
Konishi

(10) Patent No.: US 8,160,321 B2
(45) Date of Patent: Apr. 17, 2012

(54) IMAGING DEVICE, DRIVING METHOD THEREFOR AND IMAGING METHOD

(75) Inventor: Shinpei Konishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 935 days.

(21) Appl. No.: 12/179,805

(22) Filed: Jul. 25, 2008

(65) Prior Publication Data

US 2009/0046917 A1 Feb. 19, 2009

(30) Foreign Application Priority Data

Aug. 14, 2007 (JP) .................................. 2007-211512

(51) Int. Cl.
*G06K 9/00* (2006.01)
(52) U.S. Cl. ........................................................ 382/128
(58) Field of Classification Search ........... 382/128–134
See application file for complete search history.

(56) References Cited

U.S. PATENT DOCUMENTS

| | | | | |
|---|---|---|---|---|
| 5,528,043 A * | 6/1996 | Spivey et al. | ............. | 250/370.09 |
| 5,886,353 A * | 3/1999 | Spivey et al. | ............. | 250/370.09 |
| 6,751,005 B1 * | 6/2004 | Barnick et al. | ................. | 359/290 |
| 7,796,169 B2 * | 9/2010 | Kitani | ............................ | 348/247 |
| 7,804,533 B2 * | 9/2010 | Oshima | .......................... | 348/246 |
| 7,853,099 B2 * | 12/2010 | Shinmei et al. | ................. | 382/305 |
| 7,876,972 B2 * | 1/2011 | Bosco et al. | .................. | 382/261 |
| 7,929,030 B2 * | 4/2011 | Sugizaki | ....................... | 348/241 |

FOREIGN PATENT DOCUMENTS

| | | |
|---|---|---|
| JP | 10-285466 | 10/1998 |
| JP | 2006-043293 | 2/2006 |

* cited by examiner

*Primary Examiner* — Dixomara Vargas
(74) *Attorney, Agent, or Firm* — Fitzpatrick, Cella, Harper & Scinto

(57) ABSTRACT

An imaging device includes an imaging unit (120) having a sensor in which pixels including a defective pixel are arrayed in a matrix, and sensing an image, a first image reduction unit (151) reducing the image by adding pieces of pixel information of pixels adjacent in the row direction in the sensor including pixel information of the defective pixel, and adding pieces of pixel information of pixels adjacent in the column direction excluding pixel information of the defective pixel, a second image reduction unit (152) reducing the image by adding pieces of pixel information of pixels adjacent in the column direction in the sensor including pixel information of the defective pixel, and adding pieces of pixel information of pixels adjacent in the row direction excluding pixel information of the defective pixel, and a selection unit (153) selecting the unit (151) or the unit (152) when reducing the image.

14 Claims, 6 Drawing Sheets

IMAGING DEVICE, DRIVING METHOD THEREFOR AND IMAGING METHOD

BACKGROUND OF THE INVENTION

1. Field of the Invention

The present invention relates to an imaging device having a sensor in which pixels are arrayed in a matrix, and a driving method therefor and, more particularly, to an imaging device which senses an image associated with radiation such as X-rays entering the sensor, and a driving method therefor.

2. Description of the Related Art

Recently, digital X-ray imaging devices with a photoelectric conversion element are being used to acquire the intensity distribution of X-rays having passed through an object in radiography using, for example, X-rays which are a kind of radiation.

The digital X-ray imaging device is superior in sensitivity and image quality to a conventional film type imaging device. Since the digital X-ray imaging device can save an image as digital data, an image obtained by radiographing (imaging) an object can be processed by various image processes into one which makes diagnosis easier. The digital X-ray imaging device has advantages of making image management easy and allowing transfer of image data using a network.

The X-ray imaging device adopts an X-ray sensor (2D sensor) in which pixels including photoelectric conversion elements and switching elements typified by TFTs are arranged in a 2D array (2D matrix). An object is placed between an X-ray generator and the 2D sensor, and the amount of X-rays having passed through the object is converted into an electrical signal by the 2D sensor, obtaining the X-ray image of the object. Electrical signals (charges) from respective photoelectric conversion elements are independently read out and A/D-converted into digital data by an A/D converter. After the data undergo an image process, the processed data are stored or displayed.

These days, 2D sensors capable of radiographing not only still images but also moving images have been developed. Such 2D sensors are disclosed in, for example, the following patent references 1 and 2. Recently, a demand has arisen for X-ray imaging devices which radiograph not only still images but also moving images by one device in terms of work efficiency and space saving.

Patent Reference 1: Japanese Patent Laid-Open No. 10-285466

Patent Reference 2: Japanese Patent Laid-Open No. 2006-43293

The X-ray imaging device requests high resolutions in still image radiography, and high frame rates of moving images rather than high resolutions in moving image radiography such as fluorography. Even in moving image radiography, the requested resolution and frame rate change depending on the radiographic purpose. For example, neither such a high resolution nor such a high frame rate is required in moving image radiography such as preview for still image radiography. In contrast, high frame rates are required in moving image radiography of a region such as the heart, which moves quickly.

To meet these requirements, in moving image radiography, the frame rate can be increased by reading out pieces of pixel information (charges) at once from a plurality of pixels on the sensor, and adding or averaging the pieces of readout pixel information to increase the image acquisition speed. If pieces of pixel information are independently read out pixel by pixel without executing the addition or averaging process, the frame rate decreases, but a high-resolution image can be acquired.

If pieces of pixel information (charges) of 2×2 pixels are reduced into pixel information of one pixel by the addition process (or averaging process), an image can be acquired at high speed by simply adding (or averaging) and reading out analog signals.

However, if even one of 2×2 pixels is defective, the pixel after the addition process (or averaging process) must be treated as a defective pixel. In this case, the defective pixel greatly degrades a reduced image. The 2D sensor is formed from a semiconductor, and it is generally difficult to prevent generation of any defect in many pixels during the manufacturing process.

It is conceivable to prevent the degradation of a reduced image by performing the reduction process excluding pixel information of a defective pixel. In this case, for example, if pixel information can be acquired as a digital value, it is easy to select only pieces of pixel information of nondefective pixels based on position information of a defective pixel, and add (or average) them. However, in this case, pieces of pixel information of all pixels are A/D-converted, inhibiting an increase in image readout speed (i.e., an increase in frame rate). A special determination mechanism is needed to execute the addition or averaging process excluding a defective pixel before A/D conversion. This complicates the control and circuit configuration.

In short, it has conventionally been difficult to both increase the frame rate and prevent degradation of an image by a simple arrangement.

SUMMARY OF THE INVENTION

The present invention has been made to overcome the conventional drawbacks, and has as its object to both increase the frame rate and prevent degradation of an image by a simple arrangement.

According to the first aspect of the present invention, there is provided an imaging device comprising: an imaging unit which has a sensor in which a plurality of pixels including a defective pixel are arrayed in a matrix, and senses an image; a storage unit which stores position information of the defective pixel; a first image reduction unit which reduces the image by adding or averaging pieces of pixel information of a plurality of pixels adjacent in a row direction in the sensor including pixel information of the defective pixel based on the position information, and adding or averaging pieces of pixel information of a plurality of pixels adjacent in a column direction excluding pixel information of the defective pixel based on the position information; a second image reduction unit which reduces the image by adding or averaging pieces of pixel information of a plurality of pixels adjacent in the column direction in the sensor including pixel information of the defective pixel based on the position information, and adding or averaging pieces of pixel information of a plurality of pixels adjacent in the row direction excluding pixel information of the defective pixel based on the position information; and a selection unit which selects the first image reduction unit or the second image reduction unit when reducing the image.

According to the second aspect of the present invention, there is provided an imaging device comprising: an imaging unit which has a sensor in which a plurality of pixels including a defective pixel are arrayed in a matrix, and senses an image; a storage unit which stores position information of the defective pixel; a first image reduction unit which reduces the image by adding or averaging pieces of pixel information of a plurality of pixels adjacent in a row direction in the sensor including pixel information of the defective pixel based on the position information, and adding or averaging pieces of pixel information of a plurality of pixels adjacent in a column direction excluding pixel information of the defective pixel based on the position information; a second image reduction unit which reduces the image by adding or averaging pieces of pixel information of a plurality of pixels adjacent in the column direction in the sensor including pixel information of the defective pixel based on the position information, and adding or averaging pieces of pixel information of a plurality of pixels adjacent in the row direction excluding pixel information of the defective pixel based on the position information; and a selection unit which, when reducing the image, selects the first image reduction unit or the second image reduction unit for each readout unit of pieces of pixel information of the plurality of pixels arrayed in the matrix in the sensor.

According to the third aspect of the present invention, there is provided a method of driving an imaging device having an imaging unit which has a sensor in which a plurality of pixels including a defective pixel are arrayed in a matrix, and senses an image, and a storage unit which stores position information of the defective pixel, the method comprising: a first image reduction step of reducing the image by adding or averaging pieces of pixel information of a plurality of pixels adjacent in a row direction in the sensor including pixel information of the defective pixel based on the position information, and adding or averaging pieces of pixel information of a plurality of pixels adjacent in a column direction excluding pixel information of the defective pixel based on the position information; a second image reduction step of reducing the image by adding or averaging pieces of pixel information of a plurality of pixels adjacent in the column direction in the sensor including pixel information of the defective pixel based on the position information, and adding or averaging pieces of pixel information of a plurality of pixels adjacent in the row direction excluding pixel information of the defective pixel based on the position information; and a selection step of selecting the first image reduction step or the second image reduction step when reducing the image.

According to the fourth aspect of the present invention, there is provided a method of driving an imaging device having an imaging unit which has a sensor in which a plurality of pixels including a defective pixel are arrayed in a matrix, and senses an image, and a storage unit which stores position information of the defective pixel, the method comprising: a first image reduction step of reducing the image by adding or averaging pieces of pixel information of a plurality of pixels adjacent in a row direction in the sensor including pixel information of the defective pixel based on the position information, and adding or averaging pieces of pixel information of a plurality of pixels adjacent in a column direction excluding pixel information of the defective pixel based on the position information; a second image reduction step of reducing the image by adding or averaging pieces of pixel information of a plurality of pixels adjacent in the column direction in the sensor including pixel information of the defective pixel based on the position information, and adding or averaging pieces of pixel information of a plurality of pixels adjacent in the row direction excluding pixel information of the defective pixel based on the position information; and a selection step of, when reducing the image, selecting the first image reduction step or the second image reduction step for each readout unit of pieces of pixel information of the plurality of pixels arrayed in the matrix in the sensor.

According to the fifth aspect of the present invention, there is provided an imaging device comprising: an imaging unit which senses an image by using a sensor in which a plurality of pixels including a defective pixel are arrayed in a matrix; a first image reduction unit which reduces the image by synthesizing a plurality of pixels including the defective pixel, in a row direction or a column direction; and a second image reduction unit which reduces the image by synthesizing a plurality of pixels not including the defective pixel, in the direction different from the synthesis direction of the first image reduction unit.

According to the sixth aspect of the present invention, there is provided an imaging method of driving an image device comprising: an imaging step of sensing an image by using a sensor in which a plurality of pixels including a defective pixel are arrayed in a matrix; a first image reduction step of reducing the image by synthesizing a plurality of pixels including the defective pixel, in a row direction or a column direction; and a second image reduction step of reducing the image by synthesizing a plurality of pixels not including the defective pixel, in the direction different from the synthesis direction of the first image reduction step.

Further features of the present invention will become apparent from the following description of exemplary embodiments with reference to the attached drawings.

DESCRIPTION OF THE EMBODIMENTS

Gist of Invention

The gist of the present invention will be explained before a description of concrete embodiments for practicing the present invention.

To both increase the frame rate and prevent degradation of an image by a simple arrangement, the following gist of the present invention occurred to the present inventor. A case where pieces of pixel information (charges) of 2×2 pixels arrayed on a 2D sensor are reduced into pixel information of one pixel will be described as an example of a reduction process for increasing the frame rate.

The present inventor examined execution of the reduction process divisionally in two steps. The first step is to read pieces of pixel information of two pixels adjacent in one of the column and row directions, such as 1×2 pixels or 2×1 pixels out of 2×2 pixels, by a simple addition process (or averaging process) of analog signals including pixel information of a defective pixel. The second step is to perform an addition process (or averaging process) for two pixels adjacent in the other direction excluding pixel information of a defective pixel. Even if either of two adjacent pixels is a defective pixel in the process including pixel information of a defective pixel in the first step, only pixel information of the nondefective pixels can be utilized by the process excluding pixel information of the defective pixel in the second step.

A case where this reduction process is done for all pixels arrayed in a 2D matrix on a 2D sensor will be considered. Depending on the position pattern of defective pixels, the number of defective pixels in a reduced image may differ between a case where the process in the first step is done in the row direction and that in the second step is done in the column direction, and a case where the process in the first step is done in the column direction and that in the second step is done in the row direction. If a line defect is generated in a 2D sensor during the manufacture of a sensor panel or owing to aged deterioration, defective pixels are generated locally in either the row or column direction. In this case, the difference in the number of defective pixels in a reduced image becomes large. This will be explained in detail with reference to FIGS. 1 and 2.

Figure 1:
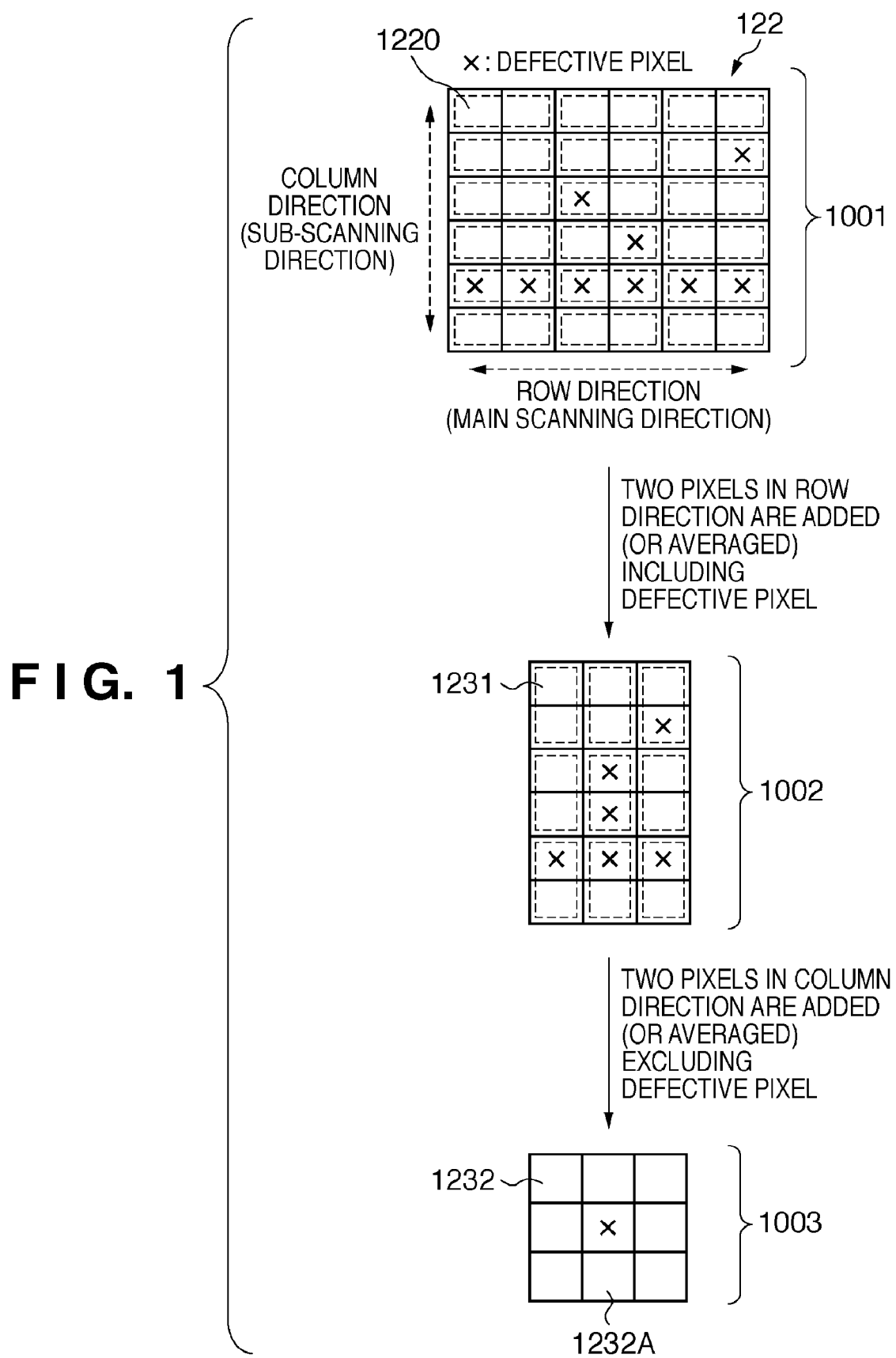
FIG. 1 is a schematic view showing a concept of the first image reduction process according to the present invention.
Figure 2:
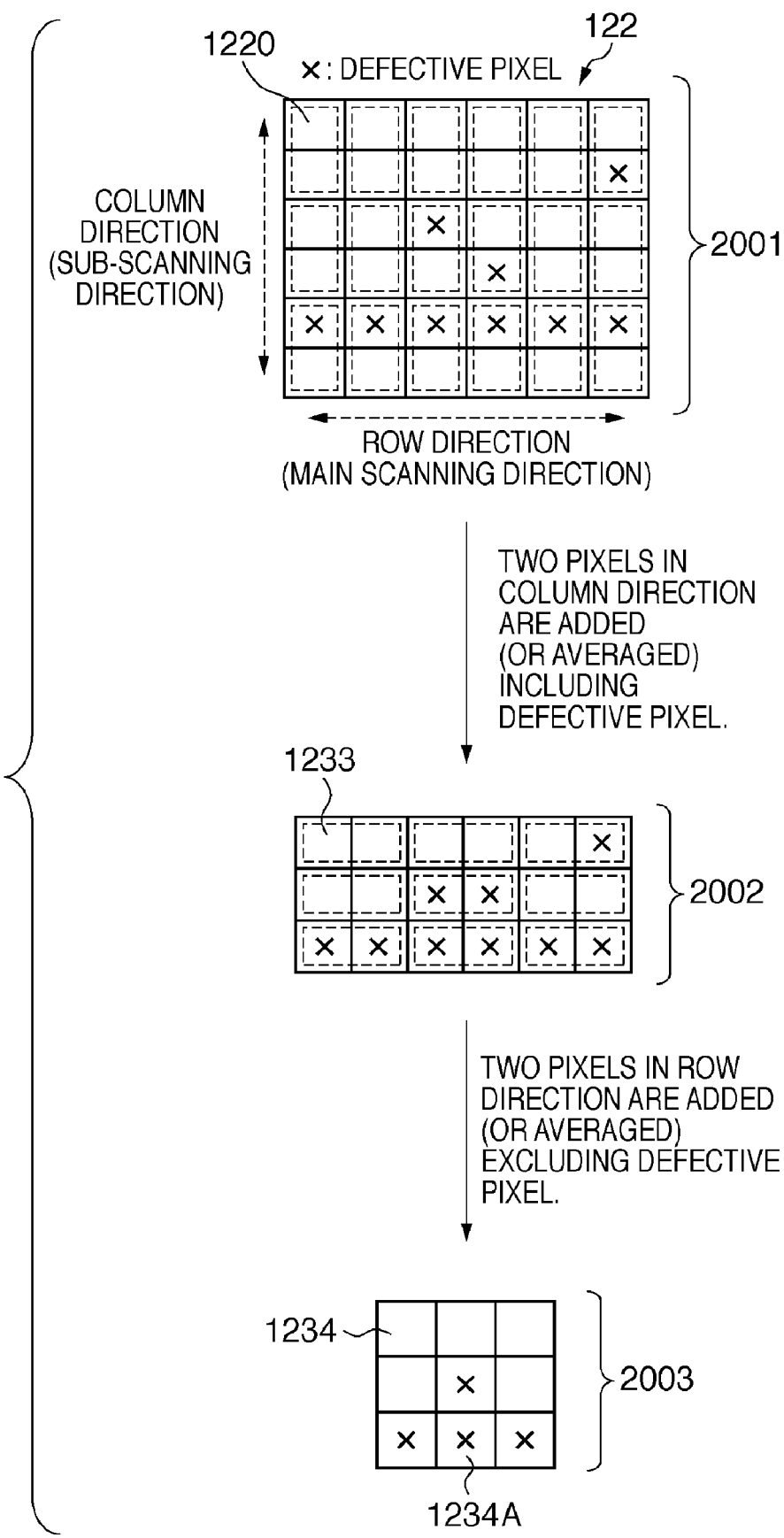
FIG. 2 is a schematic view showing a concept of the second image reduction process according to the present invention.

FIG. 1 is a schematic view showing a concept of the first image reduction process according to the present invention. FIG. 2 is a schematic view showing a concept of the second image reduction process according to the present invention.

FIGS. 1 and 2 show an example of reducing 2×2 pixels into one pixel. Reference numerals 1001 in FIG. 1 and 2001 in FIG. 2 represent a 2D sensor 122 in which a plurality of pixels 1220 including defective pixels are arrayed in a 2D matrix. In 1001 of FIG. 1 and 2001 of FIG. 2, "x" pixels 1220 are defective pixels, and blank pixels 1220 are nondefective pixels.

The first image reduction process shown in FIG. 1 will be described.

In the first image reduction process (synthesizing a plurality of pixels) shown in FIG. 1, pieces of pixel information of two pixels adjacent in the row direction in the 2D sensor 122 represented by 1001 in FIG. 1 are added (or averaged) including pixel information of a defective pixel. After the addition process (or averaging process), a plurality of pixels 1231 are obtained as represented by 1002 in FIG. 1. Subsequently, pieces of pixel information of two pixels adjacent in the column direction represented by 1002 in FIG. 1 are added (or averaged) excluding pixel information of a defective pixel. After the addition process (or averaging process), a plurality of pixels 1232 are obtained as represented by 1003 in FIG. 1. The first image reduction process generates a reduced image represented by 1003 in FIG. 1. The reduced image represented by 1003 in FIG. 1 contains one defective pixel.

The second image reduction process (synthesizing a plurality of pixels) shown in FIG. 2 will be described.

In the second image reduction process shown in FIG. 2, pieces of pixel information of two pixels adjacent in the column direction in the 2D sensor 122 represented by 2001 in FIG. 2 are added (or averaged) including pixel information of a defective pixel. After the addition process (or averaging process), a plurality of pixels 1233 are obtained as represented by 2002 in FIG. 2. Subsequently, pieces of pixel information of two pixels adjacent in the row direction represented by 2002 in FIG. 2 are added (or averaged) excluding pixel information of a defective pixel. After the addition process (or averaging process), a plurality of pixels 1234 are obtained as represented by 2003 in FIG. 2. The second image reduction process generates a reduced image represented by 2003 in FIG. 2. The reduced image represented by 2003 in FIG. 2 contains four defective pixels.

In this manner, the number of defective pixels in a reduced image differs between the first image reduction process shown in FIG. 1 and the second image reduction process shown in FIG. 2 depending on the position pattern of defective pixels formed in a 2D sensor.

Defective pixels in a reduced image undergo a defect correction process for each pixel in the reduced image. For example, even if using a correction method of compensating the pixel value of a defective pixel using pixel information of pixels adjacent to the defective pixel in the vertical and horizontal directions, the pixel value of a defective pixel 1234A represented by 2003 in FIG. 2 cannot be corrected. To the contrary, a normal pixel value can be acquired for the defective pixel 1234A represented by 1003 in FIG. 1. In this manner, a pixel in a reduced image that cannot be remedied even by the defect correction process may also be remedied by changing the reduction process.

From this, the present inventor considered arranging the first image reduction unit for performing the first image reduction process shown in FIG. 1 and the second image reduction unit for performing the second image reduction process shown in FIG. 2, and also arranging a selection unit for selecting either image reduction unit in accordance with the results of these processes.

CONCRETE EMBODIMENTS BASED ON GIST OF INVENTION

Concrete embodiments based on the gist of the present invention will be described below.

The following embodiments of the present invention will apply an X-ray imaging device as an imaging device according to the present invention. However, the present invention is not limited to this. For example, the present invention includes even a radiation imaging device which senses an image associated with radiation such as α-rays, β-rays, γ-rays, or a light beam other than X-rays.

First Embodiment

The first embodiment of the present invention will be described.

Figure 3:
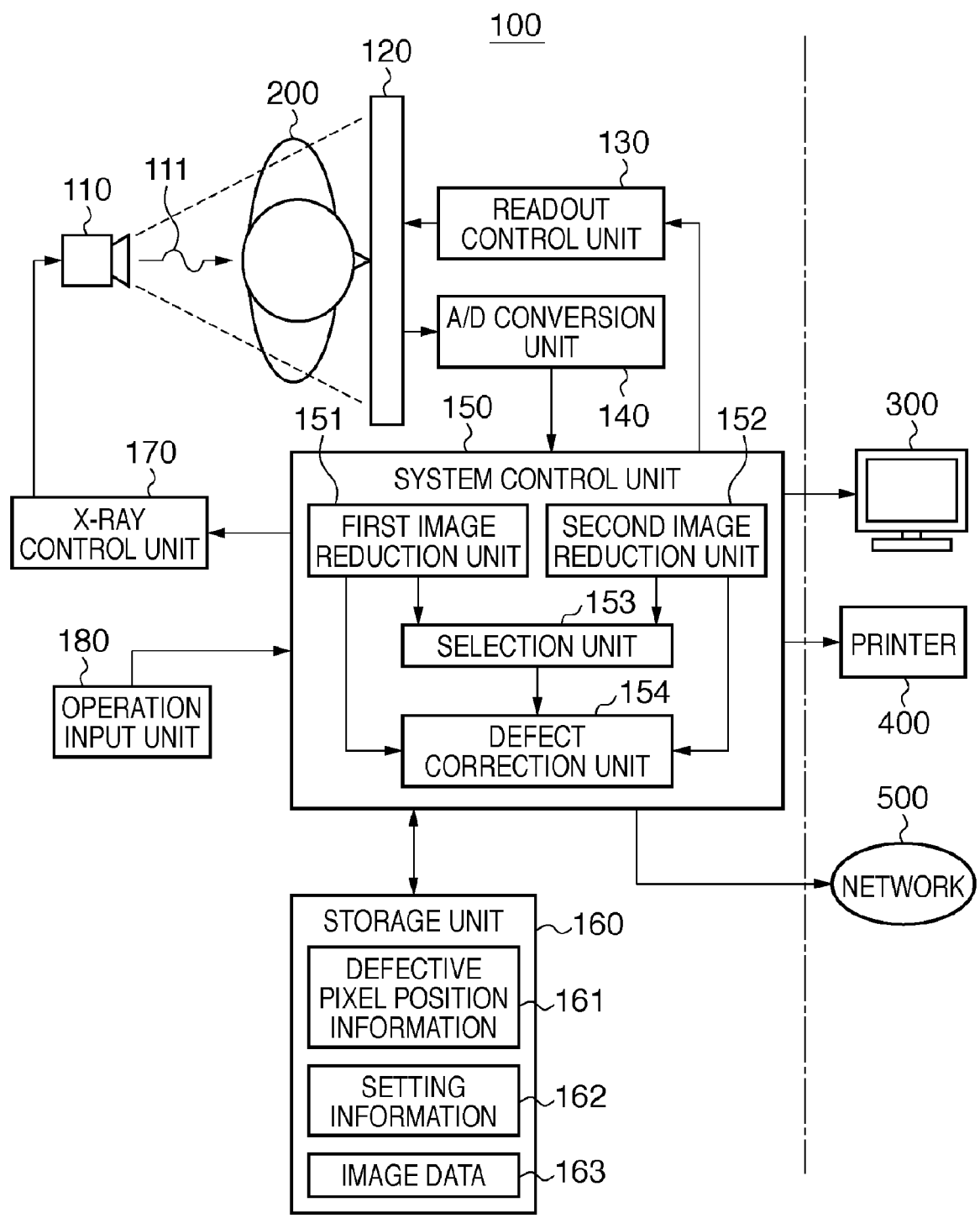
FIG. 3 is a schematic view showing an example of the schematic configuration of an X-ray imaging system including an X-ray imaging device according to the first embodiment of the present invention.

FIG. 3 is a schematic view showing an example of the schematic configuration of an X-ray imaging system including an X-ray imaging device according to the first embodiment of the present invention.

The X-ray imaging system shown in FIG. 3 comprises an X-ray imaging device 100 according to the first embodiment, a monitor 300, a printer 400, and a network 500.

The X-ray imaging device 100 comprises an X-ray generation unit 110, imaging unit 120, readout control unit 130, A/D conversion unit 140, system control unit 150, storage unit 160, X-ray control unit 170, and operation input unit 180. An object 200 is placed at a predetermined position between the X-ray generation unit 110 and the imaging unit 120.

The X-ray generation unit 110 generates X-rays 111 under the control of the X-ray control unit 170. More specifically, in the first embodiment, the X-ray generation unit 110 emits the X-rays 111 to the object 200 interposed between the X-ray generation unit 110 and the imaging unit 120.

The imaging unit 120 has a 2D sensor in which a plurality of pixels including defective pixels is arrayed in a 2D matrix. The 2D sensor converts the X-rays 111 having passed through the object 200 into an electrical signal, thereby sensing an image. More specifically, the imaging unit 120 senses an image corresponding to the intensity distribution of X-rays (radiation) entering the 2D sensor. The electrical signal is an analog signal based on charges (pixel information) stored in each pixel in accordance with the amount of incident X-ray.

The readout control unit 130 controls readout of an electrical signal detected by the 2D sensor of the imaging unit 120.

The A/D conversion unit 140 converts an electrical signal read out from the 2D sensor of the imaging unit 120 into a digital signal.

The system control unit 150 comprehensively controls driving of the building components of the X-ray imaging system shown in FIG. 3. The system control unit 150 includes, as functional components, a first image reduction unit 151, second image reduction unit 152, selection unit 153, and defect correction unit 154.

The storage unit 160 stores defective pixel position information 161 representing the position of a defective pixel present in the 2D sensor of the imaging unit 120, various kinds of setting information 162, and various image data 163.

Under the control of the system control unit 150, the X-ray control unit 170 controls the X-ray generation unit 110 and the X-rays 111 generated by the X-ray generation unit 110.

The operation input unit 180 inputs various kinds of information input from the operator into the system control unit 150.

Image data which is converted into a digital signal by the A/D conversion unit 140 and processed by the system control unit 150 is stored as the image data 163 in the storage unit 160. If necessary, the image data is processed into one suited to diagnosis by an image processing unit (not shown), and displayed on the monitor 300. In the X-ray imaging system according to the first embodiment, the image data can also be output to the printer 400 or transferred to a display device or image management system for telediagnosis via the network 500.

Each functional arrangement of the system control unit 150 will be described.

The first image reduction unit 151 performs, for example, the first image reduction process shown in FIG. 1. More specifically, the first image reduction unit 151 adds or averages pieces of pixel information of a plurality of pixels adjacent in the row direction in the 2D sensor of the imaging unit 120 including pixel information of a defective pixel based on the defective pixel position information 161, as represented by 1001 in FIG. 1 and 1002 in FIG. 1. Then, the first image reduction unit 151 adds or averages pieces of pixel information of a plurality of pixels adjacent in the column direction excluding pixel information of a defective pixel based on the defective pixel position information 161, as represented by 1002 in FIG. 1 and 1003 in FIG. 1. The process by the first image reduction unit 151 achieves the first image reduction process to reduce pieces of pixel information of pixels on a plurality of rows x a plurality of columns into pixel information of one pixel in an image sensed by the 2D sensor of the imaging unit 120.

The second image reduction unit 152 performs, e.g., the second image reduction process shown in FIG. 2. More specifically, the second image reduction unit 152 adds or averages pieces of pixel information of a plurality of pixels adjacent in the column direction in the 2D sensor of the imaging unit 120 including pixel information of a defective pixel based on the defective pixel position information 161, as represented by 2001 in FIG. 2 and 2002 in FIG. 2. Then, the second image reduction unit 152 adds or averages pieces of pixel information of a plurality of pixels adjacent in the row direction excluding pixel information of a defective pixel based on the defective pixel position information 161, as represented by 2002 in FIG. 2 and 2003 in FIG. 2. The process by the second image reduction unit 152 achieves the second image reduction process to reduce pieces of pixel information of pixels on a plurality of rows x a plurality of columns into pixel information of one pixel in an image sensed by the 2D sensor of the imaging unit 120.

When reducing an image sensed by the 2D sensor of the imaging unit 120, the selection unit 153 selects the first image reduction unit 151 or second image reduction unit 152 in accordance with the process results of the first image reduction unit 151 and second image reduction unit 152. The defect correction unit 154 performs defect correction for a defective pixel in an image reduced by the first image reduction unit 151 or second image reduction unit 152 selected by the selection unit 153.

The internal arrangement of the imaging unit 120 shown in FIG. 3 will be described.

Figure 4:
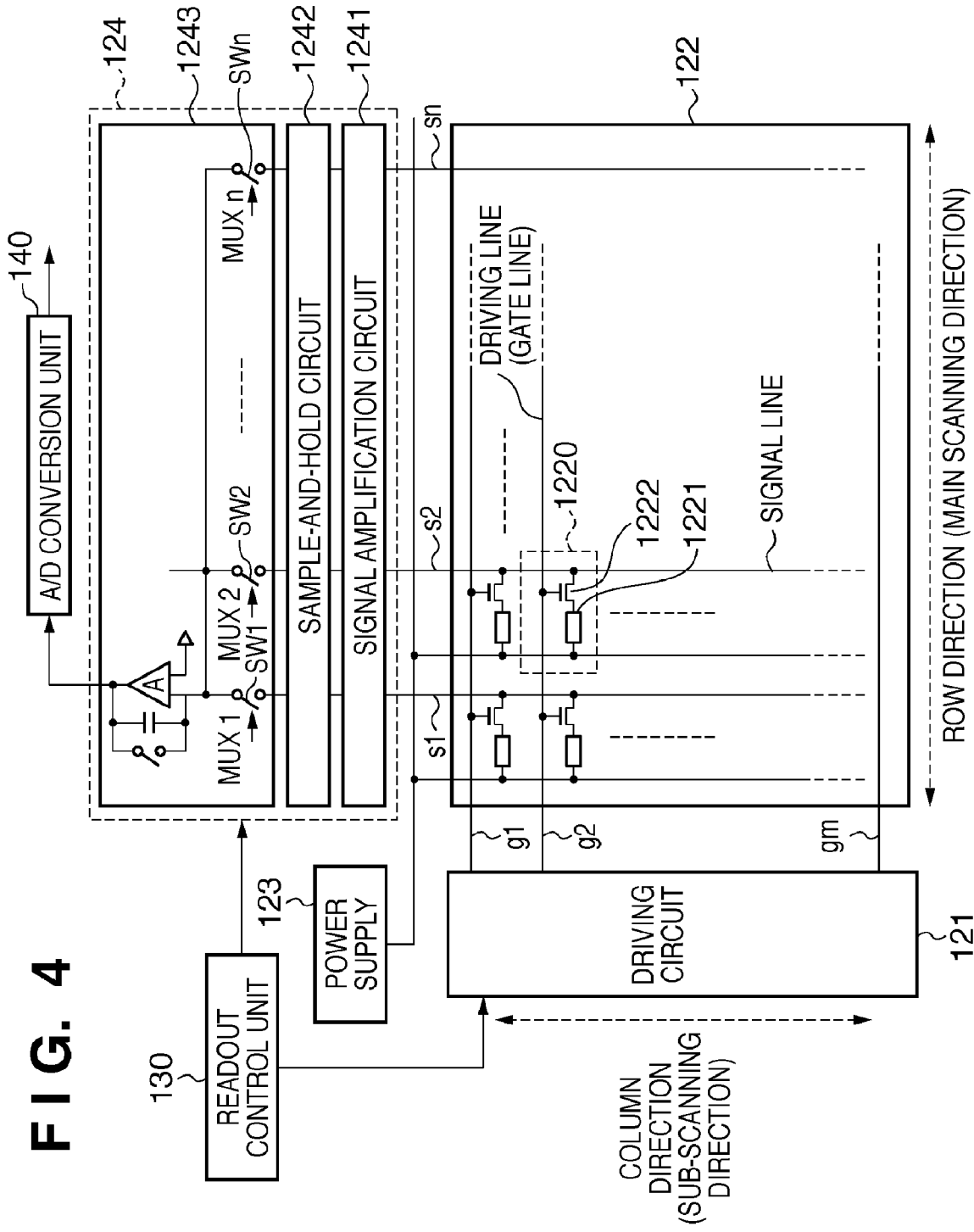
FIG. 4 is a schematic view showing an example of the internal arrangement of an imaging unit shown in FIG. 3.

FIG. 4 is a schematic view showing an example of the internal arrangement of the imaging unit 120 shown in FIG. 3.

As shown in FIG. 4, the imaging unit 120 comprises a driving circuit 121, 2D sensor 122, power supply 123, and readout circuit 124.

In the 2D sensor 122, a plurality of pixels 1220 including defective pixels are arrayed in a 2D matrix. One pixel 1220 includes one conversion element 1221 for converting incident X-rays into charges (pixel information), and a switching element 1222 for transferring charges (pixel information) converted by the conversion element 1221 to outside the pixel 1220. In the example shown in FIG. 4, m×n pixels 1220 are arrayed in the 2D sensor 122.

The conversion element 1221 comprises, for example, a photoelectric conversion element, and a phosphor above the photoelectric conversion element (between the object 200 and the photoelectric conversion element). In this case, the phosphor converts X-rays entering the conversion element 1221 into visible light, and the photoelectric conversion element converts the visible light converted by the phosphor into charges (pixel information). The conversion element 1221 in the first embodiment is not limited to one made up of the photoelectric conversion element and phosphor, and may also be a so-called direct conversion type conversion element which directly converts incident X-rays into charges (pixel information). The switching element 1222 is formed from, for example, a TFT (Thin Film Transistor).

Under the control of the readout control unit 130, the driving circuit 121 controls to drive the pixels 1220 via driving lines (gate lines) g1 to gm which connect the pixels 1220 of the 2D sensor 122 in the row direction (main scanning direction). That is, the driving circuit 121 constitutes a subscanning unit which sequentially selects pixels on a row serving as a readout unit from the pixels 1220 arrayed in a 2D matrix in the 2D sensor 122, and scans the 2D sensor 122 in the column direction (sub-scanning direction). More specifically, the driving lines g1 to gm are connected to the gate electrodes of the switching elements 1222 of the pixels 1220. The driving circuit 121 supplies driving signals to the driving lines to turn on the switching elements 1222, and externally transfers charges (pieces of pixel information) from the conversion elements 1221.

The power supply 123 applies, for example, a bias voltage to the conversion elements 1221 of the pixels 1220 of the 2D sensor 122.

Under the control of the readout control unit 130, the readout circuit 124 controls to read out charges (pieces of pixel information) from the conversion elements 1221 of the pixels 1220 via signal lines s1 to sn which connect the pixels 1220 of the 2D sensor 122 in the column direction. That is, the readout circuit 124 constitutes a main scanning unit which sequentially reads out, via the signal lines s1 to sn, charges (pieces of pixel information) from pixels on a row selected by the driving circuit 121.

More specifically, the readout circuit 124 comprises a signal amplification circuit 1241, sample-and-hold circuit 1242, and multiplexer circuit 1243. The signal amplification circuit 1241 amplifies electrical signals based on charges (pieces of pixel information) read out from the conversion elements 1221 via the switching elements 1222 and the signal lines s1 to sn. The sample-and-hold circuit 1242 holds the electrical signals processed by the signal amplification circuit 1241 until the electrical signals are transferred. The multiplexer circuit 1243 turns on switches SW1 to SWn sequentially in time series to read out the electrical signals held in the sample-and-hold circuit 1242 sequentially in time series and output them to the A/D conversion unit 140 via an amplifier A. The ON/OFF operations of the switches SW1 to SWn of the multiplexer circuit 1243 are controlled by control signals MUX1 to MUXn input from the readout control unit 130.

As described above, the system control unit 150 according to the first embodiment independently comprises the first image reduction unit 151 and second image reduction unit 152. When reducing an image based on an operation input to the operation input unit 180, the selection unit 153 selects which of the image reduction units is used.

First, a process by the first image reduction unit 151 will be described.

The first image reduction unit 151 performs the first image reduction process by controlling the driving circuit 121 and readout circuit 124 shown in FIG. 4 via the readout control unit 130. As the process by the first image reduction unit 151, a reduction process shown in FIG. 1 to reduce 2×2 pixels into one pixel will be explained.

The first image reduction unit 151 causes the driving circuit 121 to supply a driving signal for changing the potential of the driving line (gate line) g1 to Hi, turning on all the switching elements 1222 connected to the driving line g1. Then, electrical signals based on the charges (pieces of pixel information) of the pixels on the first row are read out to the readout circuit 124, and held by the sample-and-hold circuit 1242. The first image reduction unit 151 simultaneously receives the control signals MUX1 and MUX2 via the readout control unit 130 to simultaneously turn on the switches SW1 and SW2. After that, the first image reduction unit 151 simultaneously turns on the switches SW3 to SWn every two switches in order. Accordingly, the charges (pieces of pixel information) of two adjacent pixels on the first row that are held in the sample-and-hold circuit 1242 are simultaneously read out to the amplifier A, added (or averaged) as analog signals, and output to the A/D conversion unit 140. The process for the first row of the 2D sensor 122 is sequentially done for the second to m-th rows. This process is represented by 1002 in FIG. 1.

Turning on/off the switches SW1 to SWn every two switches makes it possible to perform readout by the addition process (or averaging process) of two pixels adjacent in the row direction in the 2D sensor 122 including pixel information of a defective pixel. In this case, the number of electrical signals output to the A/D conversion unit 140 can decrease, so high-speed readout can be achieved compared to a case of A/D-converting all pieces of pixel information.

An electrical signal obtained by adding (or averaging) the charges (pieces of pixel information) of two pixels adjacent in the row direction in the 2D sensor 122 is converted into a digital signal by the A/D conversion unit 140, and input to the system control unit 150 (the first image reduction unit 151). The first image reduction unit 151 adds (or averages) pieces of pixel information of two pixels adjacent in the column direction out of the electrical signal supplied from the A/D conversion unit 140 excluding pixel information of a defective pixel based on the defective pixel position information 161 stored in the storage unit 160. In this case, the first image reduction unit 151 adds (or averages) only pieces of pixel information of nondefective pixels as digital signals. By this process, 2×2 pixels are reduced into one pixel. This process is represented by 1003 in FIG. 1.

After A/D conversion by the A/D conversion unit 140, pixel information can be treated as a digital signal (digital data). Even if either of two pixels to be added is a defective pixel, it is easy to exclude pixel information of the defective pixel and reduce an image by using only pixel information of the nondefective pixel. However, when both of two pixels to be added are defective pixels, they remain defective even after reduction.

Next, a process by the second image reduction unit 152 will be described.

The second image reduction unit 152 performs the second image reduction process by controlling the driving circuit 121 and readout circuit 124 shown in FIG. 4 via the readout control unit 130. As the process by the second image reduction unit 152, a reduction process shown in FIG. 2 to reduce 2×2 pixels into one pixel will be explained.

The second image reduction unit 152 causes the driving circuit 121 to supply a driving signal for changing the potentials of the driving lines (gate lines) g1 and g2 to Hi, turning on all the switching elements 1222 connected to the two driving lines g1 and g2. Then, electrical signals based on the charges (pieces of pixel information) of the pixels on the first and second rows are simultaneously read out to the readout circuit 124, and held by the sample-and-hold circuit 1242. By simultaneously turning on the switching elements 1222 on two driving lines, the charges (pieces of pixel information) of two pixels adjacent in the column direction in the 2D sensor 122 are added (or averaged) as analog signals, and held in the sample-and-hold circuit 1242. The switches SW1 to SWn in the multiplexer circuit 1243 are sequentially turned on to sequentially output the electrical signals held in the sample-and-hold circuit 1242 to the A/D conversion unit 140 via the amplifier A. The process for the first and second rows of the 2D sensor 122 is sequentially done every two rows for the third to m-th rows. This process is represented by 2002 in FIG. 2.

By simultaneously supplying a driving signal from the driving circuit 121 to the driving lines g1 to gm every two lines, pieces of pixel information of two pixels adjacent in the column direction in the 2D sensor 122 can be added (or averaged) including pixel information of a defective pixel. In this case, the count at which pixel information is read out from each pixel of the 2D sensor 122 can be halved to achieve high-speed readout, compared to a case of supplying a driving signal to each driving line.

An electrical signal obtained by adding (or averaging) the charges (pieces of pixel information) of two pixels adjacent in the column direction in the 2D sensor 122 is converted into a digital signal by the A/D conversion unit 140, and input to the system control unit 150 (the second image reduction unit 152). The second image reduction unit 152 adds (or averages) pieces of pixel information of two pixels adjacent in the row direction out of the electrical signal supplied from the A/D conversion unit 140 excluding pixel information of a defective pixel based on the defective pixel position information 161 stored in the storage unit 160. In this case, the second image reduction unit 152 adds (or averages) only pieces of pixel information of nondefective pixels as digital signals. By this process, 2×2 pixels are reduced into one pixel. This process is represented by 2003 in FIG. 2.

After A/D conversion by the A/D conversion unit 140, pixel information can be treated as a digital signal (digital data). Even if either of two pixels to be added is a defective pixel, it is easy to exclude pixel information of the defective pixel and reduce an image by using only pixel information of the non-defective pixel. However, when both of two pixels to be added are defective pixels, they remain defective even after reduction.

A method of driving the X-ray imaging device 100 according to the first embodiment will be explained.

Figure 5:
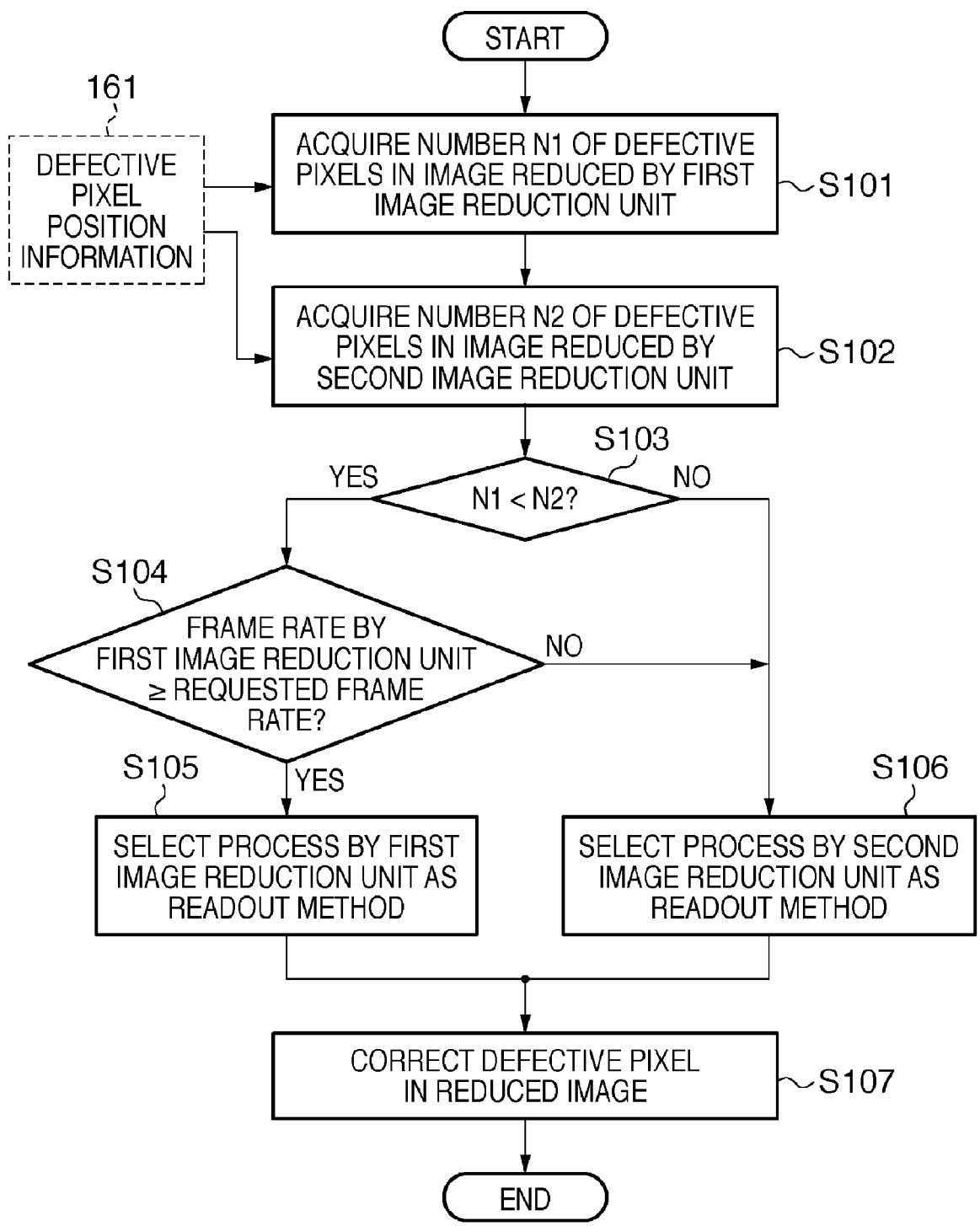
FIG. 5 is a flowchart showing an example of the process sequence of the X-ray imaging device according to the first embodiment of the present invention.

FIG. 5 is a flowchart showing an example of the process sequence of the X-ray imaging device according to the first embodiment of the present invention. Assuming that, in the following flowchart, the operator selected the image reduction mode as a radiographic mode via the operation input unit 180 and set a requested frame rate concerning radiography of the object 200, in advance.

In step S101 of FIG. 5, the first image reduction unit 151 executes the above-described first image reduction process for an image sensed by the imaging unit 120 in preliminary radiography before actual radiography by using the defective pixel position information 161 stored in the storage unit 160. The first image reduction unit 151 acquires, by calculation, the number N1 of defective pixels in an image reduced by the first image reduction process. In the example shown in FIG. 1, the number N1 of defective pixels=1 is acquired, as represented by 1003 in FIG. 1.

In step S102, the second image reduction unit 152 executes the above-described second image reduction process for the image sensed by the imaging unit 120 in preliminary radiography before actual radiography by using the defective pixel position information 161 stored in the storage unit 160. The second image reduction unit 152 acquires, by calculation, the number N2 of defective pixels in an image reduced by the second image reduction process. In the example shown in FIG. 2, the number N2 of defective pixels=4 is acquired, as represented by 2003 in FIG. 2.

In step S103, the selection unit 153 compares the number N1 of defective pixels acquired in step S101 with the number N2 of defective pixels acquired in step S102, and determines whether the number N1 of defective pixels is smaller than the number N2 of defective pixels.

If the selection unit 153 determines in step S103 that the number N1 of defective pixels is smaller than the number N2 of defective pixels, the process advances to step S104. In step S104, the selection unit 153 determines whether the frame rate obtained when the first image reduction unit 151 is used satisfies the requested frame rate input via the operation input unit 180. More specifically, in step S104, the selection unit 153 makes this determination by determining whether the frame rate obtained when the first image reduction unit 151 is used is equal to or larger than the requested frame rate input via the operation input unit 180.

If the selection unit 153 determines in step S104 that the frame rate obtained when the first image reduction unit 151 is used satisfies the requested frame rate input via the operation input unit 180, the process advances to step S105. In step S105, the system control unit 150 executes actual radiography to radiograph the object 200. The selection unit 153 selects the process by the first image reduction unit 151 as a method of reading out the (object) image sensed by the imaging unit 120, and causes the first image reduction unit 151 to perform the first image reduction process. Accordingly, the (object) image is reduced based on the first image reduction process.

If the selection unit 153 determines in step S103 that the number N1 of defective pixels is not smaller than (equal to or larger than) the number N2 of defective pixels, or if it determines in step S104 that the frame rate obtained when the first image reduction unit 151 is used does not satisfy the requested frame rate, the process advances to step S106. In step S106, the system control unit 150 executes actual radiography to radiograph the object 200. The selection unit 153 selects the process by the second image reduction unit 152 as a method of reading out the (object) image sensed by the imaging unit 120, and causes the second image reduction unit 152 to perform the second image reduction process. Accordingly, the (object) image is reduced based on the second image reduction process.

After the end of the process in step S105 or S106, the process advances to step S107. In step S107, the defect correction unit 154 performs defect correction for a defective pixel in the image reduced by the first image reduction unit 151 or second image reduction unit 152 selected by the selection unit 153. In this case, the defect correction process is done for each pixel of the reduced image. As this defect correction method, for example, pixel information of a defective pixel is compensated by pieces of pixel information of adjacent pixels.

The reduced image having undergone the defect correction process by the defect correction unit 154 is stored as the image data 163 in the storage unit 160. If necessary, the image data 163 is processed into image data suitable for diagnosis by an image processing unit (not shown), and is displayed on the monitor 300, output to the printer 400, or externally transferred via the network 500.

Through the processes in steps S101 to S107, the first image reduction process by the first image reduction unit 151 or the second image reduction process by the second image reduction unit 152 is properly selected to process an (object) image sensed by the imaging unit 120.

A characteristic process of the flowchart shown in FIG. 5 will be explained.

In step S103, the selection unit 153 compares the number N1 of defective pixels in an image reduced by the first image reduction unit 151 with the number N2 of defective pixels in an image reduced by the second image reduction unit 152. The selection unit 153 selects an image reduction unit which can obtain a smaller number of defective pixels.

The first image reduction process by the first image reduction unit 151 decreases the frame rate concerning radiography in comparison with the second image reduction process by the second image reduction unit 152. That is, the frame rate is lower in a case where the readout circuit 124 adds (or averages) pieces of pixel information of pixels adjacent in the row direction including pixel information of a defective pixel, than in a case where the driving circuit 121 adds (or averages) pieces of pixel information of pixels adjacent in the column direction including pixel information of a defective pixel. For this reason, when the frame rate obtained when the first image reduction unit 151 is used does not satisfy the requested frame rate in step S104, the selection unit 153 selects readout using the second image reduction unit 152. In this case, the selection unit 153 selects an image reduction unit having a shorter processing time when selecting the first image reduction unit 151 or second image reduction unit 152. This can further increase the frame rate concerning radiography.

If the number N1 of defective pixels equals the number N2 of defective pixels in step S103, the selection unit 153 selects readout using the second image reduction unit 152 in step S106. In this case, the selection unit 153 selects the second image reduction unit 152 having a shorter processing time (higher readout speed).

The first embodiment does not impose any restriction on acquisition of the defective pixel position information 161. For example, it is possible to use data of an inspection result in the manufacture of the 2D sensor 122, or use data obtained by performing test sensing without generating any X-ray. As an example of the image reduction processing, the first embodiment has described a process to reduce pieces of pixel information (charges) of 2×2 pixels into pixel information of one pixel (i.e., a process using 2×2 pixels as the reduction unit). However, the present invention is not limited to this. For example, the present invention is also applicable to a form in which 4×4 pixels or 8×8 pixels are reduced as the reduction unit. Note that the reduction unit is desirably a divisor of the total number of rows of the 2D sensor 122.

As described above, in the X-ray imaging device 100 according to the first embodiment, the selection unit 153 selects the first image reduction unit 151 or second image reduction unit 152 when reducing and reading out an (object) image sensed by the imaging unit 120.

This configuration can increase the frame rate and prevent degradation of an image by a simple arrangement.

More specifically, in the X-ray imaging device 100 according to the first embodiment, the selection unit 153 selects an image reduction unit which can obtain a smaller number of defective pixels in a reduced image. Hence, the X-ray imaging device 100 can provide a high-quality image almost free from degradation. When the requested frame rate is high, the selection unit 153 selects an image reduction unit having a higher processing speed (shorter processing time). The X-ray imaging device 100 can cope with even radiography requiring high frame rate. In addition, the X-ray imaging device 100 according to the first embodiment can be implemented by a simple circuit configuration without any complicated hardware configuration for excluding a defective pixel before readout by simple addition (averaging) of analog electrical signals.

Second Embodiment

The second embodiment of the present invention will be described.

The schematic configuration of an X-ray imaging system including an X-ray imaging device according to the second embodiment is the same as that of the X-ray imaging system including the X-ray imaging device according to the first embodiment shown in FIG. 3. In the first embodiment, the selection unit 153 determines, for the entire 2D sensor 122, which of the first image reduction process by the first image reduction unit 151 or the second image reduction process by the second image reduction unit 152 is to be executed. To the contrary, in the second embodiment, a selection unit 153 determines, every plurality of rows in a 2D sensor 122, which of the first image reduction process by a first image reduction unit 151 or the second image reduction process by a second image reduction unit 152 is to be executed. That is, the selection unit 153 determines, for each readout unit of pieces of pixel information of pixels arrayed in the 2D sensor 122 by a readout circuit 124, which of the first image reduction process by the first image reduction unit 151 or the second image reduction process by the second image reduction unit 152 is to be executed.

A method of driving an X-ray imaging device 100 according to the second embodiment will be explained.

Figure 6:
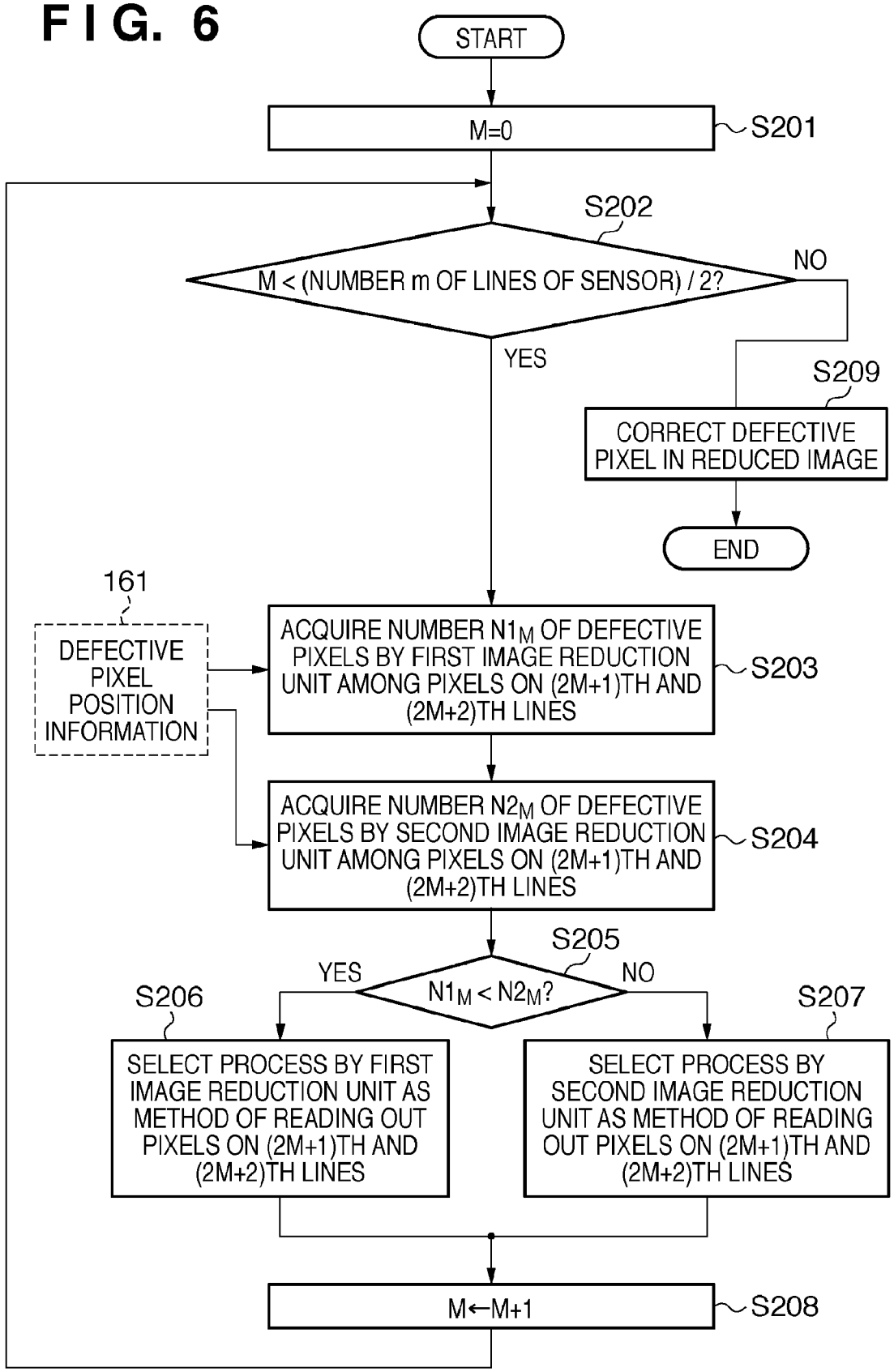
FIG. 6 is a flowchart showing an example of the process sequence of an X-ray imaging device according to the second embodiment of the present invention.

FIG. 6 is a flowchart showing an example of the process sequence of the X-ray imaging device according to the second embodiment of the present invention. The following flowchart will exemplify a case of reading out pieces of pixel information of pixels on every two rows arranged in the 2D sensor 122 as the readout unit of the readout circuit 124. In the following description, the number m of rows of pixels 1220 arrayed in a 2D matrix in the 2D sensor 122 is an even number.

In step S201 of FIG. 6, a system control unit 150 sets 0 as a variable M representing the readout unit number of the readout circuit 124. Accordingly, the readout unit number M is set.

In step S202, in order to read out pieces of pixel information every two rows by the readout circuit 124 according to the second embodiment, the system control unit 150 determines whether the readout unit number M is smaller than half the number m of rows of the 2D sensor 122. That is, in step S202, the system control unit 150 determines whether a pixel which has not undergone readout by the readout circuit 124 still exists among the pixels of the 2D sensor 122.

If the system control unit 150 determines in step S202 that the readout unit number M is smaller than half the number m of rows of the 2D sensor 122, it determines that a pixel which has not undergone readout by the readout circuit 124 still exists among the pixels of the 2D sensor 122, and the process advances to step S203. In step S203, the first image reduction unit 151 executes the above-described first image reduction process for pixels on the (2M+1)th and (2M+2)th rows in an image sensed by an imaging unit 120 in preliminary radiography before actual radiography by using defective pixel position information 161. The first image reduction unit 151 acquires, by calculation, the number $N1_M$ of defective pixels in an image which is reduced by the first image reduction process and corresponds to the pixels on the (2M+1)th and (2M+2)th rows.

In step S204, the second image reduction unit 152 executes the above-described second image reduction process for pixels on the (2M+1)th and (2M+2)th rows in the image sensed by the imaging unit 120 in preliminary radiography before actual radiography by using the defective pixel position information 161. The second image reduction unit 152 acquires, by calculation, the number $N2_M$ of defective pixels in an image which is reduced by the second image reduction process and corresponds to the pixels on the (2M+1)th and (2M+2)th rows.

In step S205, the selection unit 153 compares the number $N1_M$ of defective pixels acquired in step S203 with the number $N2_M$ of defective pixels acquired in step S204, and determines whether the number $N1_M$ of defective pixels is smaller than the number $N2_M$ of defective pixels.

If the selection unit 153 determines in step S205 that the number $N1_M$ of defective pixels is smaller than the number $N2_2M$ of defective pixels, the process advances to step S206. In step S206, the selection unit 153 selects the process by the first image reduction unit 151 as a method of reading out pieces of pixel information from pixels on the (2M+1)th and (2M+2)th rows of an (object) image sensed by the imaging unit 120 in actual radiography of radiographing an object 200. Then, the selection unit 153 causes the first image reduction unit 151 to perform the first image reduction process.

If the selection unit 153 determines in step S205 that the number $N1_M$ of defective pixels is not smaller than (equal to or larger than) the number $N2_M$ of defective pixels, the process advances to step S207. In step S207, the selection unit 153 selects the process by the second image reduction unit 152 as a method of reading out pieces of pixel information from pixels on the (2M+1)th and (2M+2)th rows of the (object) image sensed by the imaging unit 120 in actual radiography of radiographing the object 200. Then, the selection unit 153 causes the second image reduction unit 152 to perform the second image reduction process.

After the end of the process in step S206 or S207, the process advances to step S208. In step S208, the system control unit 150 changes the readout unit number M by incrementing by one the variable M representing the readout unit number of the readout circuit 124. The system control unit 150 executes the process from step S202 again for the changed readout unit number M.

If the system control unit 150 determines in step S202 that the readout unit number M is equal to or larger than half the number m of rows of the 2D sensor 122, it determines that the readout circuit 124 has read out pieces of pixel information from all the pixels of the 2D sensor 122, and the process advances to step S209. In step S209, the system control unit 150 generates an image reduced by the first or second image reduction process for each readout unit, and a defect correction unit 154 performs defect correction for a defective pixel in the reduced image. In this case, the defect correction process is done for each pixel of the reduced image. As this defect correction method, for example, pixel information of a defective pixel is compensated by pieces of pixel information of adjacent pixels.

The reduced image having undergone the defect correction process by the defect correction unit 154 is stored as image data 163 in a storage unit 160. If necessary, the image data 163 is processed into image data suitable for diagnosis by an image processing unit (not shown), and is displayed on a monitor 300, output to a printer 400, or externally transferred via a network 500.

Through the processes in steps S201 to S209, the first image reduction process by the first image reduction unit 151 or the second image reduction process by the second image reduction unit 152 is properly selected and executed for each readout unit of the readout circuit 124.

A characteristic process of the flowchart shown in FIG. 6 will be explained.

In step S205, the selection unit 153 compares the number $N1_M$ of defective pixels in the readout unit of an image reduced by the first image reduction unit 151 with the number $N2_M$ of defective pixels in the readout unit of an image reduced by the second image reduction unit 152. As a result of comparing the number $N1_M$ of defective pixels with the number $N2_M$ of defective pixels, the selection unit 153 selects an image reduction unit which can obtain a smaller number of defective pixels (step S206 or S207).

If the number $N1_M$ of defective pixels equals the number $N2_M$ of defective pixels in step S205, the selection unit 153 selects readout using the second image reduction unit 152 in step S207. In this case, the selection unit 153 selects the second image reduction unit 152 which can obtain a shorter processing time (higher readout speed).

The second embodiment has exemplified a process in which the readout unit of the readout circuit 124 is set to two rows of the 2D sensor 122 and the reduction unit is set to 2×2 pixels. However, the present invention is not limited to this. For example, the present invention is also applicable to a form in which the reduction unit is set to 4×4 pixels and the readout unit is set to four rows of the 2D sensor 122, or a form in which the reduction unit is set to 8×8 pixels and the readout unit is set to eight rows of the 2D sensor 122. Note that the reduction unit is desirably a divisor of the total number of rows of the 2D sensor 122. The readout unit need not always coincide with the reduction unit, and may also be, for example, an integer multiple of the reduction unit. For example, when the reduction unit is 2×2 pixels, the readout unit may also be set to an integer multiple of the reduction unit, such as two rows, four rows, or six rows.

In the second embodiment, a plurality of rows corresponding to the readout unit are selected from the top to bottom of the 2D sensor 122. However, the present invention is not limited to this, and a plurality of rows corresponding to the readout unit may also be selected from the bottom to top of the 2D sensor 122.

As described above, in the X-ray imaging device 100 according to the second embodiment, the selection unit 153 selects the first image reduction unit 151 or second image reduction unit 152 in each readout unit of the readout circuit 124.

This configuration can further decrease the number of defective pixels in a reduced image, and provide an image almost free from degradation, in addition to the effects of the X-ray imaging device according to the first embodiment.

The units (building components) in FIG. 3 which constitute the X-ray imaging device 100 according to each embodiment described above, and the steps in FIGS. 5 and 6 representing the method of driving the X-ray imaging device 100 can be implemented by activating a program stored in the RAM or ROM of a computer. The program and a computer-readable storage medium storing the program fall within the scope of the present invention.

More specifically, the program is provided to a computer by storing the program in a storage medium such as a CD-ROM, or via various transmission media. As the storage medium storing the program, a flexible disk, hard disk, magnetic tape, magneto-optical disk, nonvolatile memory card, and the like are available in addition to the CD-ROM. As the program transmission medium, a communication medium in a computer network (e.g., LAN, WAN such as the Internet, or wireless communication network) system for propagating program information as carrier waves to supply the program information is available. Examples of the communication medium are a wired channel such as an optical fiber, or a wireless channel.

The present invention is not limited to a form in which the functions of the X-ray imaging device 100 according to each embodiment are implemented by executing a supplied program by the computer. Also, when the functions of the X-ray imaging device 100 according to each embodiment are implemented by the program in cooperation with an OS (Operating System) or other application software running on the computer, this program falls within the scope of the present invention. Also, when the functions of the X-ray imaging device 100 according to each embodiment are implemented by performing all or some of processes of the supplied program by means of a function expansion board or unit of the computer, this program falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-211512 filed Aug. 14, 2007, which is hereby incorporated by reference herein in its entirety.

What is claimed is:
1. An imaging device comprising:
an imaging unit which has a sensor in which a plurality of pixels including a defective pixel are arrayed in a matrix, and senses an image;

a storage unit which stores position information of the defective pixel;

a first image reduction unit which reduces the image by adding or averaging pieces of pixel information of a plurality of pixels adjacent in a row direction in the sensor including pixel information of the defective pixel based on the position information, and adding or averaging pieces of pixel information of a plurality of pixels adjacent in a column direction excluding pixel information of the defective pixel based on the position information;

a second image reduction unit which reduces the image by adding or averaging pieces of pixel information of a plurality of pixels adjacent in the column direction in the sensor including pixel information of the defective pixel based on the position information, and adding or averaging pieces of pixel information of a plurality of pixels adjacent in the row direction excluding pixel information of the defective pixel based on the position information; and a selection unit which selects the first image reduction unit or the second image reduction unit when reducing the image.

2. The imaging device according to claim 1, wherein the selection unit compares the number of defective pixels in the image reduced by the first image reduction unit with the number of defective pixels in the image reduced by the second image reduction unit, and selects one of the first and second image reduction units which can obtain a smaller number of defective pixels.

3. The imaging device according to claim 1, wherein, when selecting the first image reduction unit or the second image reduction unit, the selection unit selects one of the first and second image reduction units which can obtain a shorter processing time.

4. The imaging device according to claim 1, wherein the selection unit compares the number of defective pixels in the image reduced by the first image reduction unit with the number of defective pixels in the image reduced by the second image reduction unit, and when the numbers of defective pixels equal each other, selects one of the first and second image reduction units which can obtain a shorter processing time.

5. The imaging device according to claim 1, wherein the imaging unit further comprises a sub-scanning unit which sequentially selects pixels on a row corresponding to a readout unit from the plurality of pixels arrayed in the matrix in the sensor, and a main scanning unit which sequentially reads out pieces of pixel information of pixels on a row selected by the sub-scanning unit.

6. The imaging device according to claim 5, wherein, when adding or averaging pieces of pixel information of a plurality of pixels adjacent in the row direction in the sensor including pixel information of the defective pixel, the first image reduction unit causes the main scanning unit to simultaneously read out the pieces of pixel information of the plurality of pixels adjacent in the row direction, and adds or averages the pieces of pixel information as analog signals.

7. The imaging device according to claim 5, wherein, when adding or averaging pieces of pixel information of a plurality of pixels adjacent in the column direction in the sensor including pixel information of the defective pixel, the second image reduction unit causes the sub-scanning unit to simultaneously select pixels on a plurality of rows associated with the plurality of pixels adjacent in the column direction, and adds or averages, as analog signals, pieces of pixel information of the simultaneously selected pixels on the plurality of rows.

8. The imaging device according to claim 1, wherein, when adding or averaging pieces of pixel information of a plurality of adjacent pixels excluding pixel information of the defective pixel, the first image reduction unit and the second image reduction unit add or average only pieces of pixel information of non-defective pixels other than the defective pixel as digital signals on the basis of the position information of the defective pixel stored in the storage unit.

9. The imaging device according to claim 1, further comprising a defect correction unit which performs defect correction for the defective pixel in the image reduced by the first image reduction unit or the second image reduction unit selected by the selection unit.

10. The imaging device according to claim 1, wherein the imaging unit senses an image corresponding to an intensity distribution of radiation incident on the sensor.

11. An imaging device comprising:

an imaging unit which has a sensor in which a plurality of pixels including a defective pixel are arrayed in a matrix, and senses an image;

a storage unit which stores position information of the defective pixel;

a first image reduction unit which reduces the image by adding or averaging pieces of pixel information of a plurality of pixels adjacent in a row direction in the sensor including pixel information of the defective pixel based on the position information, and adding or averaging pieces of pixel information of a plurality of pixels adjacent in a column direction excluding pixel information of the defective pixel based on the position information;

a second image reduction unit which reduces the image by adding or averaging pieces of pixel information of a plurality of pixels adjacent in the column direction in the sensor including pixel information of the defective pixel based on the position information, and adding or averaging pieces of pixel information of a plurality of pixels adjacent in the row direction excluding pixel information of the defective pixel based on the position information; and a selection unit which, when reducing the image, selects the first image reduction unit or the second image reduction unit for each readout unit of pieces of pixel information of the plurality of pixels arrayed in the matrix in the sensor.

12. The imaging device according to claim 11, wherein the selection unit compares the number of defective pixels in the readout unit in the image reduced by the first image reduction unit with the number of defective pixels in the readout unit in the image reduced by the second image reduction unit, and selects one of the first and second image reduction units which can obtain a smaller number of defective pixels.

13. The imaging device according to claim 11, wherein the selection unit compares the number of defective pixels in the readout unit in the image reduced by the first image reduction unit with the number of defective pixels in the readout unit in the image reduced by the second image reduction unit, and when the numbers of defective pixels equal each other, selects one of the first and second image reduction units which can obtain a shorter processing time.

14. An imaging device comprising:

an imaging unit which senses an image by using a sensor in which a plurality of pixels including a defective pixel are arrayed in a matrix;

a first image reduction unit which reduces the image by synthesizing a plurality of pixels including the defective pixel, in a row direction or a column direction; and a second image reduction unit which reduces the image by synthesizing a plurality of pixels not including the defective pixel, in the direction different from the synthesis direction of the first image reduction unit.

* * * * *